United States Patent [19]
Kardell

[11] Patent Number: 5,248,097
[45] Date of Patent: Sep. 28, 1993

[54] HANDY AIR

[76] Inventor: Michael R. Kardell, 720 N.E. 40th Ct., Fort Lauderdale, Fla. 33334

[21] Appl. No.: 881,360

[22] Filed: May 11, 1992

[51] Int. Cl.[5] .............................................. B05B 1/30
[52] U.S. Cl. ................................. 239/443; 239/525; 239/583; 239/DIG. 21
[58] Field of Search ............... 239/289, 525, DIG. 21, 239/DIG. 22, 442, 447, 443, 583; 51/266, 266 A, 323

[56] References Cited

U.S. PATENT DOCUMENTS

| | | | |
|---|---|---|---|
| 1,367,246 | 2/1921 | Ewald | 239/583 |
| 1,948,852 | 2/1934 | Gilfoy | 239/289 |
| 3,722,800 | 3/1973 | Shames et al. | 239/447 |
| 3,827,635 | 8/1974 | Krakowski et al. | 239/525 |
| 4,091,999 | 5/1978 | Voos | 239/DIG. 22 |

FOREIGN PATENT DOCUMENTS 3239009  4/1984  Fed. Rep. of Germany ...... 239/447

Primary Examiner—Andres Kashnikow
Assistant Examiner—Christopher G. Trainor

[57] ABSTRACT

In-line adjustable air flow gun is to be permanently installed in the air line, and used with other pneumatic air tools, such as sanders, die grinders, drills, impact wrenches, duel action sanders and spray guns. It's primary function is to blow away debris, by providing an adjustable air flow as is necessary to accomplish a large variety of different situations.

5 Claims, 3 Drawing Sheets

HANDY AIR

BACKGROUND, OBJECTS AND SUMMARY OF THE INVENTION

This invention relates to the multi-functional adaptability of an in-line air gun. In so much, that the air gun is installed in the air line between the air line and the air tool quick disconnect coupling allowing air tools to be changed with out removing the in-line air gun, from the air line. Also, relating to the adjustable air flow this gun provides.

This air gun is designed to direct an adjustable blast of compressed air in such a way as to remove dust or particles from any surface, with out disconnecting any type of air tool that might be employed at the end of the same air line. Thus associating the air gun with the performance of a variety of functions in connection with an auto body shop, machine grinding shop and/or any maintenance type work.

The primary object of the invention is to provide an air gun with an adjustable air flow, that is easy to operate, solidly built, and never needs to be disconnected from the air line which makes it, impossible to misplace, and very handy to use.

Further objects, advantages and features of the present invention will be understood by reference to the following specifications in conjunction with annexed drawings, wherein like parts have been given like numbers.

DESCRIPTION OF PREFERRED EMBODIMENT

Figure 1:
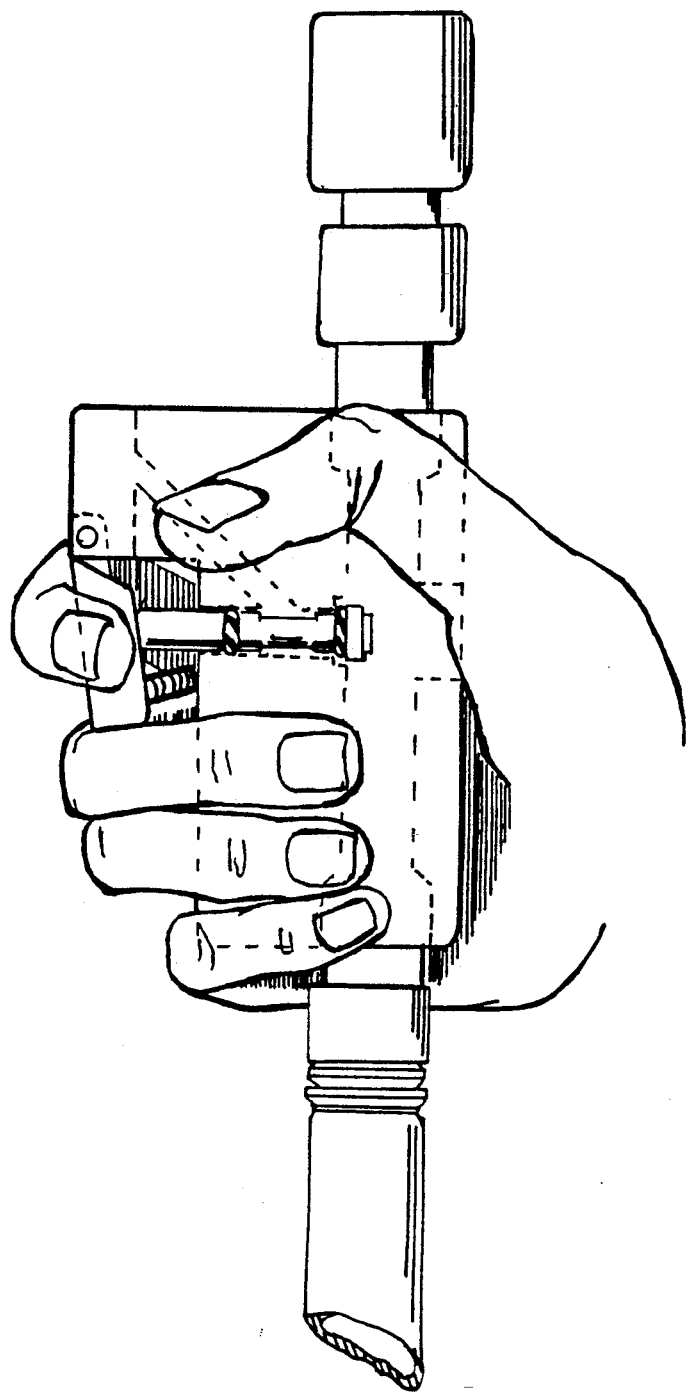
FIG. 1 is an abstract drawing of the invention showing the air compressor inlet line attached to the bottom of the gun, inserting air into the main air chamber, while the finger pulls the trigger, releasing the air into the air nozzle. It also, shows the air flowing in the main air chamber on up into the quick disconnect coupling, to service other air tools.

Referring now to the figures, there is seen an air "in" port 8, threaded for the air compressor inlet hose to be attached at this port 8, supplying the air to the main air chamber 13.

The trigger mechanism 3 when depressed against the piston 2 releasing air from the main air chamber 13 into the secondary air chamber 14 this in turn allows air to enter the nozzle air chamber 15. The trigger mechanism is pivotally connected to the air gun body 1 by a pin 5.

When the blow gun is not in use, the air flows into the main air chamber 13 from the air "in" port 8, thus flowing into the air "out" port 9, and into any air tool that is attached. The air does not flow into the secondary air chamber 14 because the force of the air line pressure inside the main air chamber 13 provides enough pressure to keep the piston return stop 12 engaged, until a force greater than the air pressure in the main air chamber 13 is exerted, releasing the piston return stop 12.

Figure 5:
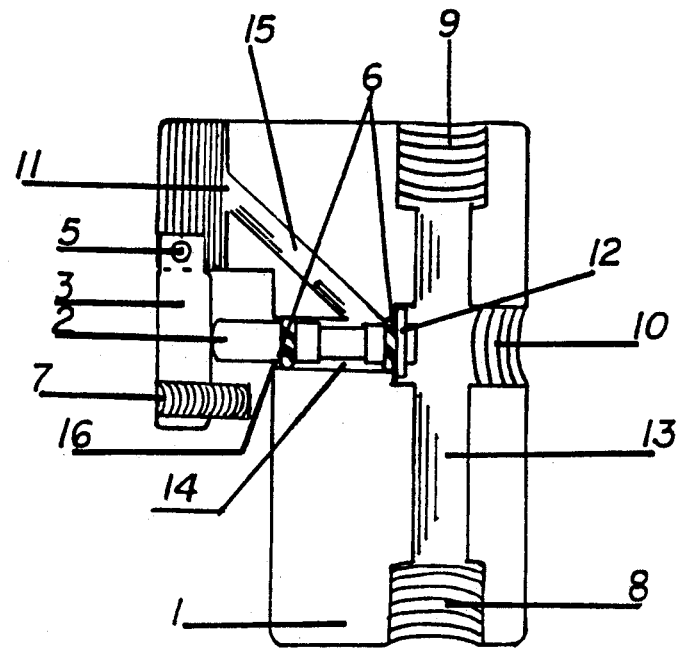
FIG. 5 shows a cross section view of the air, with the trigger not engaged.
Figure 6:
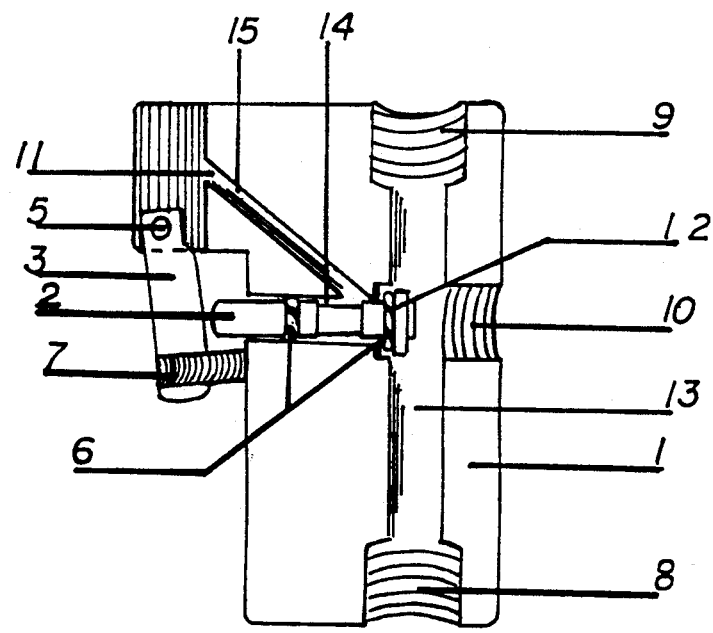
FIG. 6 shows a cross section view of the air gun with the trigger engaged thus depressing the piston which allow the air to flow into the air nozzle chamber. The amount of air allowed into the chamber is controlled by the adjusting screw. In this drawing the piston is fully engaged, allowing the maximum air flow.

Referring to FIG. 5 you will note a trigger travel adjusting screw 7 located in the trigger 3. By turning the adjusting screw 7 you control how far the trigger 3 will depress the piston 2, thus controlling the amount of air entering the nozzle air chamber 15 and being dispersed thru the blow gun nozzle 11.

The piston 2 fits into the bore 16 with two "o" rings 6, used to stop air from escaping the trigger end of the secondary air chamber 14 and to stop air from escaping the main air chamber 13, into the secondary air chamber 14. Also, note the piston 2 is constructed with a disc end called the piston return stop 12, which depresses against the walls of the main air chamber 13. The piston return stop 12 together with the "o" rings 6, stops air from flowing from one chamber to the next.

The body 1 is machined from solid aircraft quality aluminum bar stock with minimum wall thickness of 0.250 inches. The piston port 10 is a threaded hole enabling the insertion of the piston 2 and the "o" rings 6 into the bore chamber 16. Then the piston port plug 4 is inserted into the threaded piston port 10, seated and machined flush with the exterior of the body 1.

Figure 2:
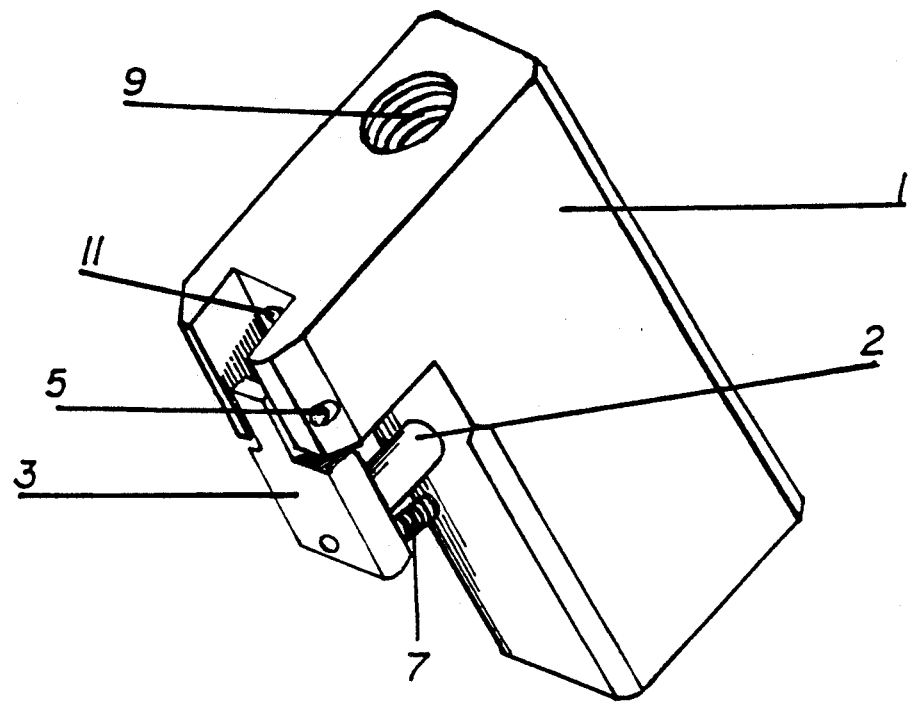
FIG. 2 is a peripheral view of the air gun, showing the trigger mechanism, the handle (or body), the blow gun nozzle, and the air out port, also showing the piston, the adjusting screw, and the dowel pin which holds the trigger mechanism.
Figure 3:
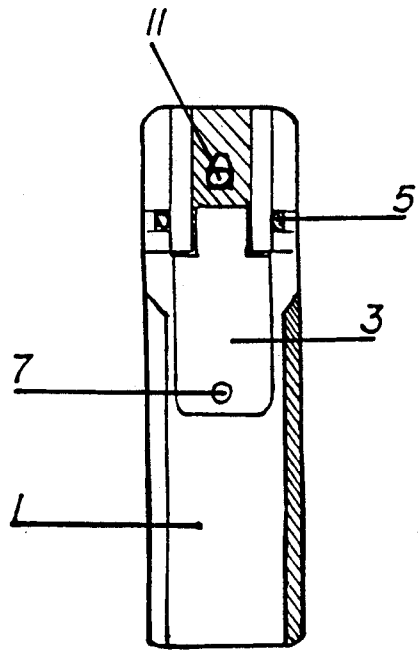
FIG. 3 this is a peripheral front side view of the invention showing the blow gun nozzle, the trigger, the adjusting screw and the body.
Figure 4:
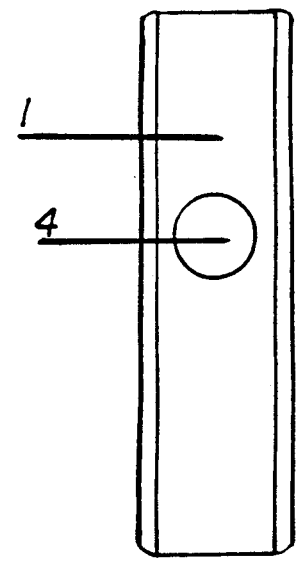
FIG. 4 this is a peripheral rear side view showing the piston port plug ground flush with the body of invention stopping all access to the air and piston chamber.

In meeting with the safety standards relating to the use of high pressure blow guns, the face of the nozzle, as shown in FIG. 2, has been recessed in order to avoid physical contact with the direct air pressure. Such recess insures that if the right end of the nozzle is dead ended, that is, placed up against a palm or some other portion of a person's body, air can readily escape through this recessed area and be diverted without causing damage to the body.

What is claimed is:

1. An in-line air gun comprising:
    a solid stock aluminum body having a longitudinal axis, said body comprising a first bore extending through said body transverse to the longitudinal axis and having a first threaded end and a second end, a second bore having first and second threaded ends extending through said body parallel to the longitudinal axis, said second bore intersecting said first bore, a third bore communicating with said first bore and extending through said body from said first bore diagonally through a side wall of said body;
    a piston movably fitted within said first bore, said piston having a piston stop at a first end thereof and a second end extending through the second end of said first bore;
    a trigger pivotally connected to said body by a pin, the trigger contacting said second end of said piston such that upon depressing said trigger, said piston stop is moved from a first position to a second position, said trigger having an adjustment screw extending from said trigger towards said body, the distance between said adjustment screw and said body defining the maximum distance of movement of said piston stop; and wherein said first end of said second bore is adapted to be connected to an air supply line and said second end of said second bore is adapted to be connected to an air tool, such that when said piston stop is in said first position, said piston stop prevents air from flowing from said second bore into said first and third bores, and when said piston stop is in said second position, air is permitted to flow from said second bore into said first bore, from said first bore into said third bore, and from said third bore, through the side wall of said body.

2. The device as defined in claim 1, wherein the adjustment screw is adjustable such that the maximum distance of movement of said piston stop can be changed to thereby control the amount of air flowing by said piston stop from said second bore into said first bore.

3. The device as defined in claim 1, wherein the piston is sized to be inserted into said body through said first threaded end of said first bore, and said device further comprises a brass plug fitted into and sealing said first threaded end of said first bore, said plug being ground flush with said body.

4. The device as defined in claim 1, wherein said solid stock aluminum body has a minimum wall thickness of 0.25 inches.

5. The device of claim 1, wherein the piston further comprises first and second o-rings which define an air chamber about the inlet end of said third bore.

* * * * *